(12) United States Patent
Lee

(10) Patent No.: US 10,033,601 B2
(45) Date of Patent: Jul. 24, 2018

(54) METHOD OF REPORTING CQI AND RELATED COMMUNICATION DEVICE

(71) Applicant: Industrial Technology Research Institute, Hsinchu (TW)

(72) Inventor: Chien-Min Lee, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 118 days.

(21) Appl. No.: 14/140,576

(22) Filed: Dec. 26, 2013

(65) Prior Publication Data

US 2014/0185479 A1    Jul. 3, 2014

Related U.S. Application Data

(60) Provisional application No. 61/746,570, filed on Dec. 28, 2012.

(51) Int. Cl.
| | |
|---|---|
| H04B 17/24 | (2015.01) |
| H04W 72/02 | (2009.01) |
| H04B 17/309 | (2015.01) |
| H04L 12/26 | (2006.01) |
| H04L 1/00 | (2006.01) |

(Continued)

(52) U.S. Cl.
CPC ............ *H04L 43/06* (2013.01); *H04B 17/24* (2015.01); *H04L 1/0007* (2013.01); *H04L 1/0016* (2013.01); *H04L 1/0026* (2013.01); *H04L 5/0057* (2013.01); *H04W 72/02* (2013.01); *H04B 17/309* (2015.01); *H04W 72/0446* (2013.01)

(58) Field of Classification Search
CPC ..... H04B 17/309; H04B 17/24; H04L 1/0007; H04L 1/0016; H04L 1/0026; H04L 43/06; H04L 5/0057; H04W 72/02
See application file for complete search history.

(56) References Cited

U.S. PATENT DOCUMENTS

| | | |
|---|---|---|
| 2004/0082328 A1 | 4/2004 | Japenga |
| 2005/0170782 A1 | 8/2005 | Rong |
| 2005/0250529 A1 | 11/2005 | Funnell |

(Continued)

FOREIGN PATENT DOCUMENTS

| | | |
|---|---|---|
| CN | 1914827 A | 2/2007 |
| CN | 1941682 A | 4/2007 |

(Continued)

OTHER PUBLICATIONS

Catt, Analysis of coverage improvement for low-cost MTC LTE UEs, 3GPP TSG RAN WG1 Meeting #71, R1-125247, Nov. 12-16, 2012, XP050663126, New Orleans, USA.

(Continued)

*Primary Examiner* — Kent Krueger
(74) *Attorney, Agent, or Firm* — Winston Hsu

(57) ABSTRACT

A method of reporting channel quality indicator (CQI) for a communication device comprises performing a channel measurement on a channel between the communication device and a network; determining a number of at least one reference resource needed for achieving a channel quality indicator (CQI) level according to the channel measurement; and transmitting an indicator indicating the number of the at least one reference resource to the network.

21 Claims, 13 Drawing Sheets

CQI mapping table with newly added entries — 60

| CQI index | Number | Modulation | Code rate x 1024 | Efficiency | |
|---|---|---|---|---|---|
| 0 "0 0 0 0" | 128 | Out of range | | | |
| 1 "0 0 0 1" | 128 | QPSK | 78 | - | |
| 2 "0 0 1 0" | 64 | QPSK | 78 | - | |
| 3 "0 0 1 1" | 32 | QPSK | 78 | - | Newly added entries |
| 4 "0 1 0 0" | 16 | QPSK | 78 | - | |
| 5 "0 1 0 1" | 8 | QPSK | 78 | - | |
| 6 "0 1 1 0" | 4 | QPSK | 78 | - | |
| 7 "0 1 1 1" | 2 | QPSK | 78 | - | |
| 8 "1 0 0 0" | 1 | QPSK | 78 | 0.1523 | |
| 9 "1 0 0 1" | 1 | QPSK | 120 | 0.2344 | |
| ... | | | | | |
| 13 "1 1 0 1" | 1 | QPSK | 602 | 1.1758 | |
| 14 "1 1 1 0" | 1 | 16QAM | 378 | 1.4766 | |
| 15 "1 1 1 1" | 1 | 64QAM | 466 | 2.7305 | |

(51) Int. Cl.
*H04L 5/00* (2006.01)
*H04W 72/04* (2009.01)

(56) References Cited

U.S. PATENT DOCUMENTS

| | | | |
|---|---|---|---|
| 2009/0067386 A1 | 3/2009 | Kitazoe | |
| 2009/0116570 A1* | 5/2009 | Bala | H04L 1/0026 375/260 |
| 2010/0120395 A1 | 5/2010 | Chiba | |
| 2012/0008574 A1 | 1/2012 | Xiao | |
| 2012/0076028 A1* | 3/2012 | Ko | H04L 1/0026 370/252 |
| 2013/0223235 A1 | 8/2013 | Hu | |
| 2013/0301434 A1* | 11/2013 | Krishnamurthy | H04L 1/0026 370/252 |
| 2015/0092566 A1 | 4/2015 | Balachandran | |

FOREIGN PATENT DOCUMENTS

| | | |
|---|---|---|
| CN | 101640579 A | 2/2010 |
| EP | 1 770 889 A2 | 4/2007 |
| EP | 1 770 889 A3 | 10/2008 |
| EP | 2 012 455 A2 | 1/2009 |
| EP | 2 012 455 A3 | 10/2012 |
| WO | 2011123755 A1 | 10/2011 |
| WO | 2012008957 A1 | 1/2012 |
| WO | 2013119158 A1 | 8/2013 |

OTHER PUBLICATIONS

3GPP, 3rd Generation Partnership Project; Technical Specification Group Radio Access Network; Evolved Universal Terrestrial Radio Access (E-UTRA); User Equipment (UE) procedures in idle mode (Release 11), 3GPP TS 36.304 V11.1.0 (Sep. 2012), Sep. 19, 2012, pp. 1-33, XP050649483, 3GPP Organizational Partners, Valbonne, France.
Ericsson et al., Required functionality for coverage enhancements for MTC, 3GPP TSG-RAN WG1 Meeting #71, R1-124888, Nov. 12-16, 2012, XP050663058, New Orleans, USA.
Huawei et al., Cell selection and reselection in coverage enhancement, 3GPP TSG RAN WG2 Meeting #85, R2-140327, Feb. 10-14, 2014, pp. 1-3, XP050737545, Prague, Czech Republic.
Catt, Discussion on mobility support for Low Complexity MTC UEs and MTC coverage enhancement, 3GPP TSG RAN WG2 Meeting #84, R2-134040, Nov. 11-15, 2013, XP050736847, San Francisco, USA.
MediaTek Inc., Coverage Enhancement Analysis and Techniques for MTC Devices, 3GPP TSG-RAN WG1 #71, R1-124942, New Orleans, Louisiana, USA, Nov. 12-16, 2012.
LG Electronics, Discussion on Coverage Enhancement for a low-cost MTC UE, 3GPP TSG RAN WG1 #71, R1-124993, New Orleans, USA, Nov. 12-16, 2012.
Alcatel-Lucent et al., "Potential solutions for improved coverage for MTC UEs", 3GPP TSG-RAN WG1 Meeting #71, R1-124883, New Orleans, USA, Nov. 12-16, 2012, p. 1.

* cited by examiner

CQI mapping table — 40

| CQI index | Modulation | Code rate x 1024 | Efficiency |
|---|---|---|---|
| 0 | | Out of range | |
| 1 | QPSK | 78 | 0.1523 |
| 2 | QPSK | 120 | 0.2344 |
| 3 | QPSK | 193 | 0.3770 |
| ... | | | |
| 14 | 64QAM | 873 | 5.1152 |
| 15 | 64QAM | 948 | 5.5547 |

Bit representation table — 42

| "0 0" | 16 |
|---|---|
| "0 1" | 32 |
| "1 0" | 64 |
| "1 1" | 128 |

FIG. 4

CQI mapping table with corresponding parameters

| CQI index | Modulation | Code rate x 1024 | Efficiency | Parameter |
|---|---|---|---|---|
| 1 | QPSK | 78 | 0.1523 | 2 |
| 2 | QPSK | 120 | 0.2344 | 4 |
| 3 | QPSK | 193 | 0.3770 | 8 |

FIG. 5

CQI mapping table with newly added entries — 60

| CQI index | Number | Modulation | Code rate x 1024 | Efficiency |
|---|---|---|---|---|
| 0 "0000" | 128 | Out of range | | |
| 1 "0001" | 128 | QPSK | 78 | - |
| 2 "0010" | 64 | QPSK | 78 | - |
| 3 "0011" | 32 | QPSK | 78 | - |
| 4 "0100" | 16 | QPSK | 78 | - |
| 5 "0101" | 8 | QPSK | 78 | - |
| 6 "0110" | 4 | QPSK | 78 | - |
| 7 "0111" | 2 | QPSK | 78 | - |
| 8 "1000" | 1 | QPSK | 78 | 0.1523 |
| 9 "1001" | 1 | QPSK | 120 | 0.2344 |
| ... | | | | |
| 13 "1101" | 1 | QPSK | 602 | 1.1758 |
| 14 "1110" | 1 | 16QAM | 378 | 1.4766 |
| 15 "1111" | 1 | 64QAM | 466 | 2.7305 |

Newly added entries (CQI indices 1–8)

FIG. 6

CQI mapping table

| CQI index | Modulation | Code rate x 1024 | Efficiency |
|---|---|---|---|
| 0 | | Out of range | |
| 1 | QPSK | 78 | 0.1523 |
| 2 | QPSK | 120 | 0.2344 |
| 3 | QPSK | 193 | 0.3770 |
| ... | | | |
| 14 | 64QAM | 873 | 5.1152 |
| 15 | 64QAM | 948 | 5.5547 |

~80

Bit representation table

| "0 0" | No reporting |
|---|---|
| "0 1" | 64 |
| "1 0" | 128 |
| "1 1" | 256 |

| $I_{TBS}$ | | $N_{PRB}$ | | | | |
|---|---|---|---|---|---|---|
| | 1 | 6 | 15 | 25 | 50 | 100 |
| 0 | 16 | 152 | 392 | 680 | 1384 | 2792 |
| 1 | 24 | 208 | 520 | 904 | 1800 | 3624 |
| 2 | 32 | 256 | 648 | 1096 | 2216 | 4584 |
| ... | ... | ... | ... | ... | ... | ... |
| 8 | 120 | 808 | 2088 | 3496 | 6968 | 14112 |
| 9 | 136 | 936 | 2344 | 4008 | 7992 | 15840 |
| 10 | 144 | 1032 | 2664 | 4392 | 8760 | 17568 |
| ... | ... | ... | ... | ... | ... | ... |
| 25 | 616 | 3752 | 9528 | 15840 | 31704 | 63776 |
| 26 | 712 | 4392 | 11064 | 18336 | 36696 | 75376 |

FIG. 13

METHOD OF REPORTING CQI AND RELATED COMMUNICATION DEVICE

CROSS REFERENCE TO RELATED APPLICATIONS

This application claims the benefit of U.S. Provisional Application No. 61/746,570, filed on Dec. 28, 2012 and entitled "Methods of CSI measurement and report for coverage enhancement", the contents of which are incorporated herein in their entirety.

BACKGROUND OF THE INVENTION

1. Field of the Invention

The present invention relates to a method used in a wireless communication system and related communication device, and more particularly, to a method of reporting CQI and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmission/reception, UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

In certain situations, the UE needs to obtain (e.g., measure) channel state information (CSI) and to report the CSI to the network. In general, the UE transmits a channel quality indicator (CQI) in a CQI mapping table (e.g., defined in the 3GPP standard) corresponding to the CSI to report the CSI. However, the CSI may be too poor such that a proper CQI corresponding to the CSI cannot be found in the CQI mapping table. In this situation, the UE may transmit the lowest CQI (i.e., the lowest CQI level) to the network. The network simply knows that the UE is with a poor channel without knowing how poor the channel is, after receiving the lowest CQI. Accordingly, the network may determine not to communicate with the UE, or may communicate with the UE according to an improper modulation and coding scheme (MCS) determined according to the received CQI. As a result, throughput of UE may be degraded.

Thus, how to report the CSI accurately is an important problem to be solved.

SUMMARY OF THE INVENTION

The present invention therefore provides a method and related communication device for reporting CQI to solve the abovementioned problem.

A method of reporting channel quality indicator (CQI) for a communication device comprises performing a channel measurement on a channel between the communication device and a network; determining a number of at least one reference resource needed for achieving a channel quality indicator (CQI) level according to the channel measurement; and transmitting an indicator indicating the number of the at least one reference resource to the network.

A method of reporting channel quality indicator (CQI) for a communication device comprises performing a channel measurement on a channel between the communication device and a network; determining a CQI level achieved by using at least one reference resource according to the channel measurement; and transmitting a first indicator indicating the CQI level to the network.

A method of selecting a transport block size for a communication device comprises receiving a first number of physical resource blocks and an indicator of transport block size in downlink control information transmitted by a network; dividing the first number of physical resource blocks by a parameter to obtain a second number of physical resource blocks; selecting the transport block size from a transport block size table according to the second number of physical resource blocks and the indicator of transport block size; and transmitting or receiving a plurality of information bits with the transport block size in a subframe to or from the network.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a schematic diagram of a CQI mapping table and a bit representation table according to an example of the present invention.

FIG. 5 is a schematic diagram of a CQI mapping table including corresponding parameters according to an example of the present invention.

FIG. 6 is a schematic diagram of a CQI mapping table including newly added entries according to an example of the present invention.

FIG. 8 is a schematic diagram of a CQI mapping table and a bit representation table according to an example of the present invention.

FIG. 13 is a schematic diagram of a transport block size table and a bit representation table according to an example of the present invention.

DETAILED DESCRIPTION

Figure 1:
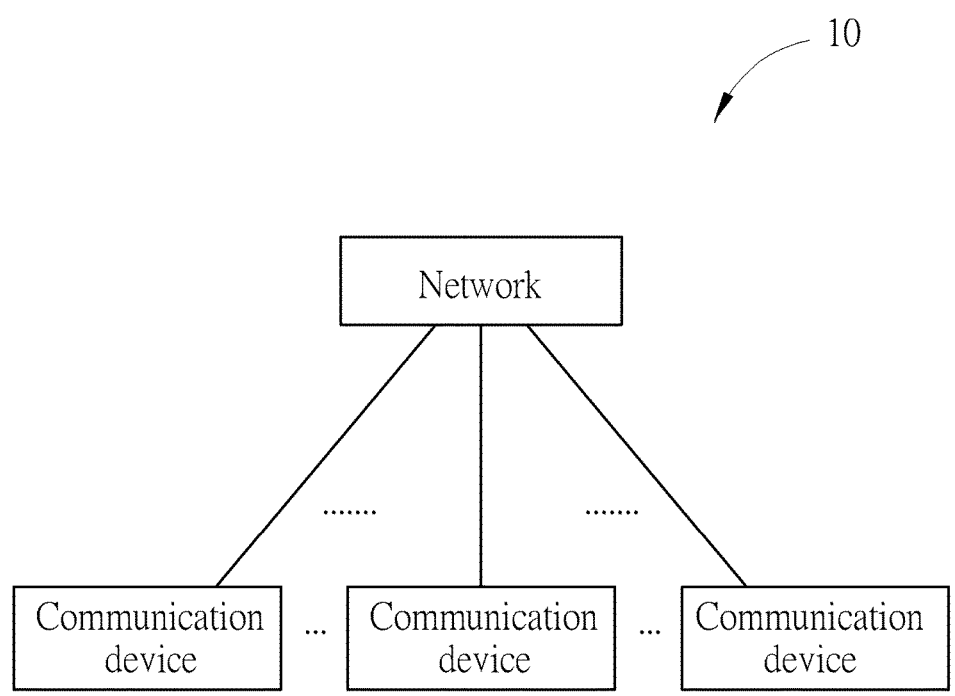
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). In another example, the network can be an evolved UTRAN (E-UTRAN) comprising a plurality of evolved NBs (eNBs) and/or relays in a long term evolution (LTE) system, a LTE-Advanced (LTE-A) system or an evolution of the LTE-A system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network. A communication device can be a user equipment (UE), a low cost device (e.g., machine type communication (MTC) device), a mobile phone, a laptop, a tablet computer, an electronic book or a portable computer system. Besides, the network and the communication device can be seen as a transmitter or a receiver according to direction, e.g., for an uplink (UL), the communication device is the transmitter and the network is the receiver, and for a downlink (DL), the network is the transmitter and the communication device is the receiver.

Figure 2:
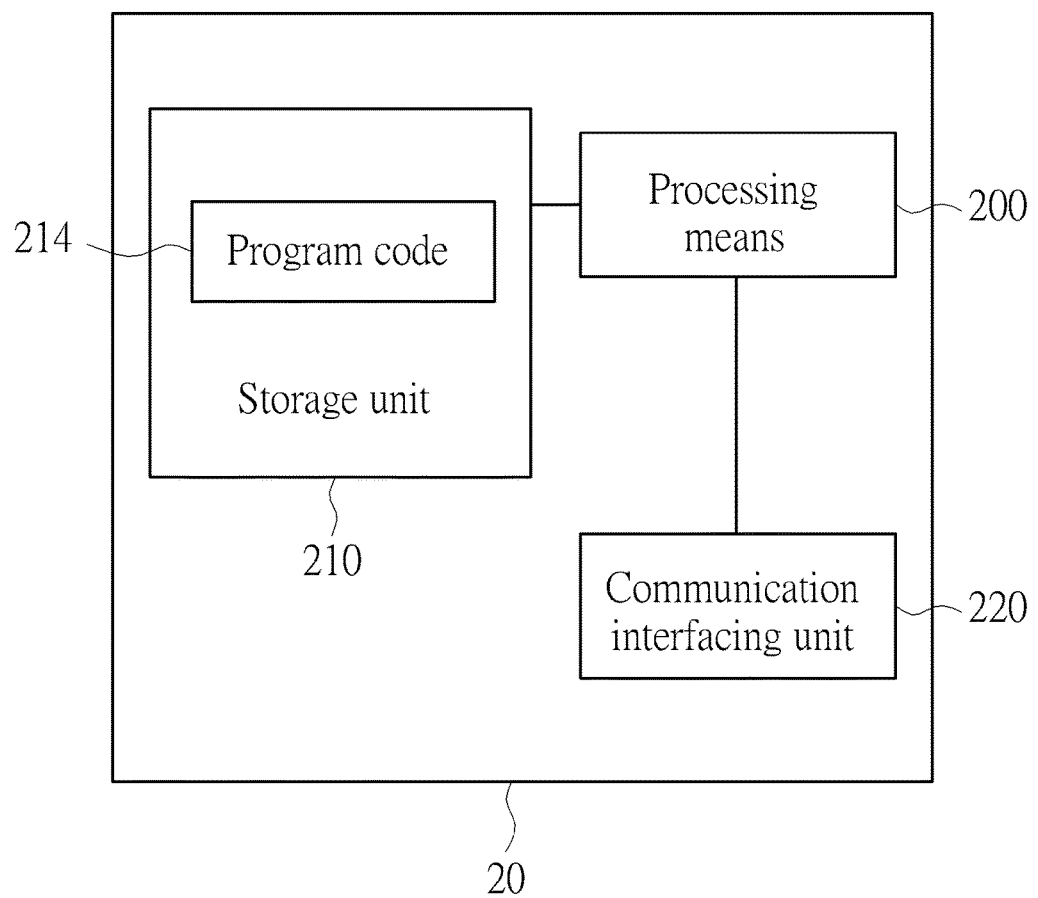
FIG. 2 is a schematic diagram of a communication device according to an example of the present invention.

Please refer to FIG. 2, which is a schematic diagram of a communication device 20 according to an example of the present invention. The communication device 20 can be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 maybe any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
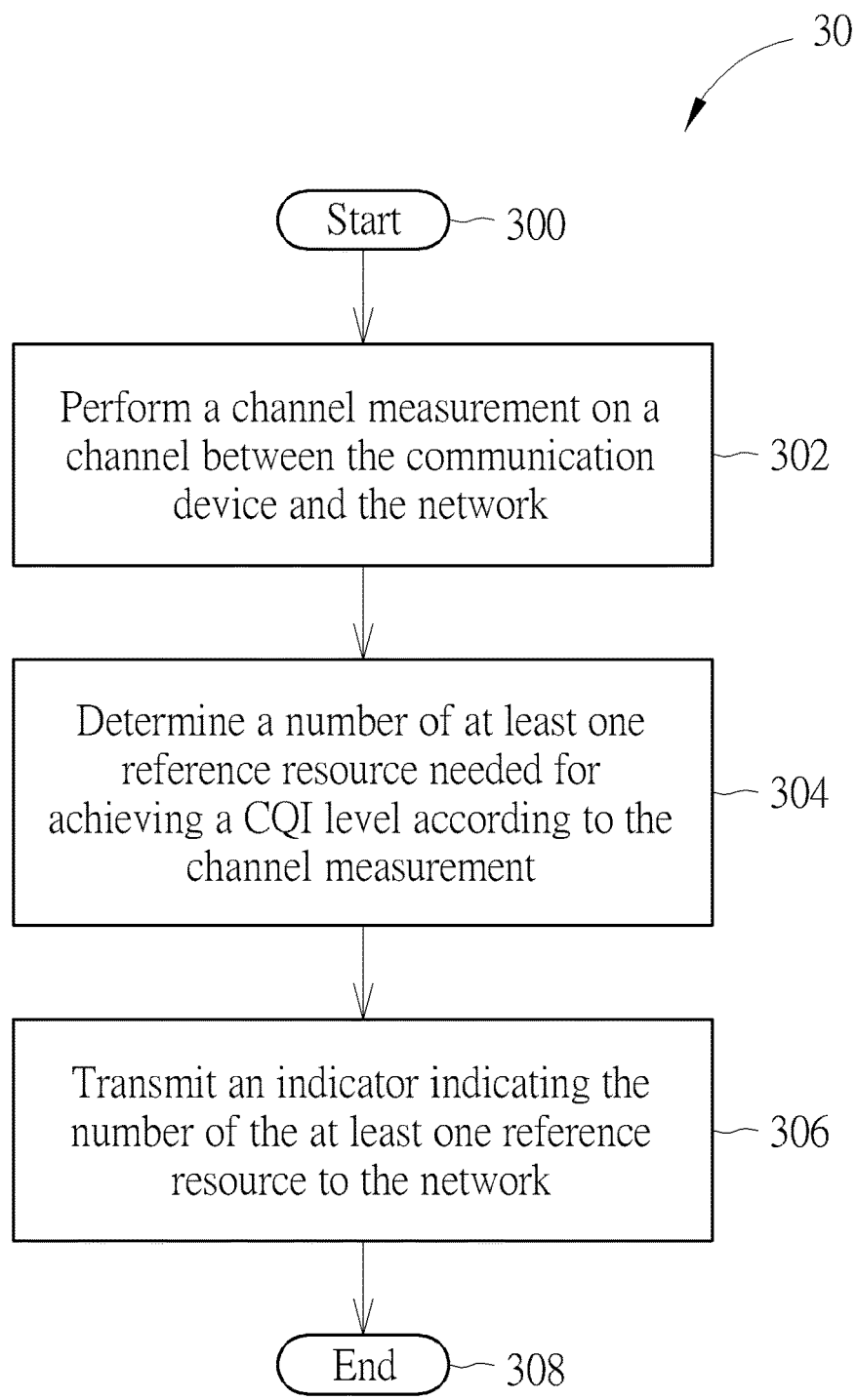
FIG. 3 is a flowchart of a process according to an example of the present invention.

Please refer to FIG. 3, which is a flowchart of a process 30 according to an example of the present invention. The process 30 can be utilized in a communication device shown in FIG. 1, for reporting channel quality indicator (CQI). The process 30 maybe compiled into the program code 214 and includes the following steps:

Step 300: Start.

Step 302: Perform a channel measurement on a channel between the communication device and the network.

Step 304: Determine a number of at least one reference resource needed for achieving a CQI level according to the channel measurement.

Step 306: Transmit an indicator indicating the number of the at least one reference resource to the network.

Step 308: End.

According to the process 30, the communication device performs a channel measurement on a channel between the communication device and the network, and determines a number of at least one reference resource (e.g., CSI reference resource) needed for achieving a (e.g., predetermined) CQI level (i.e., CQI or CQI index) according to the channel measurement. For example, the CQI level may be the lowest CQI level that guarantees a block error rate (BLER)≤0.1. Note that a reference resource can be referred to any resource capable of being used for performing the channel measurement, e.g., for determining quality of the communication device and the network. For example, a reference resource may need to be accumulated (e.g., combined) for N times via a combination method to achieve the CQI level. Then, the communication device transmits an indicator indicating the number of the at least one reference resource to the network. In other words, the network is able to know the channel accurately according to both the CQI level and the number of the at least one reference resource. Thus, the network can communicate with the communication device according to a proper modulation and coding scheme (MCS) corresponding to the received CQI level. As a result, throughput of the communication device is improved.

Realization of the present invention is not limited to the above description.

In one example, the communication device may be for coverage enhancement (CE), and the CQI mapping table may be designed for the CE. In one example, the CE may correspond to at least one first parameter, a first criterion and/or at least one first dedicated resource different from at least one second parameter, a second criterion and/or at least one second dedicated resource corresponding to a normal mode defined in the 3GPP standard. That is, the CE can be seen as a mode in which the communication device can perform an operation in a way (e.g., easily and/or quickly under a relaxed requirement) different from that of the normal mode. Note that the at least one first parameter, the first criterion and/or the at least one first dedicated resource may be obtained by modifying the at least one second parameter, the second criterion and/or the at least one second dedicated resource defined in the 3GPP standard, respectively. In another example, the at least one first parameter, the first criterion and/or the at least one first dedicated resource may be newly added (e.g., defined) in the 3GPP standard (e.g., of a new version).

In one example, the CQI level in the process 30 may be the lowest CQI level (e.g., with or without considering the CQI level indicating "out of range") in a CQI mapping table. That is, severity of the channel is resolved (i.e., identified) according to the number of the at least one reference resource needed for achieving the lowest CQI level, even if the communication device is with a poor channel. Thus, the network can accurately determine how to communicate with the communication device according to the number of the at least one reference resource.

In addition, the CQI level may be configured (e.g., indicated) to the communication device via a higher layer signaling (e.g., radio resource control (RRC) signaling) or via a CSI request field of DL control information transmitted by the network. That is, the CQI level may not be determined by the communication device, but may be indicated by the network via the higher layer signaling or via the CSI request field. In another example, the indicator transmitted by the communication device in the process 30 may indicate a base number, wherein the number of the at least one reference resource is a function of the base number and a parameter. That is, the number of the at least one reference resource is determined according to both the base number and the parameter. The parameter can be predetermined, configured via a higher layer signaling (e.g., RRC signaling), or configured dynamically (e.g., via a CSI request field of DL control information transmitted by the network).

In addition, the indicator may be represented by a plurality of bits. That is, the bits representing the indicator are transmitted to the network for providing information of the number of the at least one reference resource to the network. In another example, the indicator may indicate the number of the at least one reference resource to the network by indicating a newly added entry in a CQI mapping table. That is, existed entries in the CQI mapping table may not be enough for accurately identifying the CQI level (e.g., due to insufficient resolution). Thus, one or more new entries can be added in the CQI mapping table for the communication device to indicate a CQI level by using one of the newly added entry(ies). Further, the CQI mapping table can even be newly designed for including the newly added entry(ies).

Please refer to FIG. 4, which is a schematic diagram of a CQI mapping table 40 and a bit representation table 42 according to an example of the present invention, wherein corresponding MCSs and efficiencies are also shown. In one example, the communication device may determine that it needs 32 reference resources to achieve the lowest CQI level (i.e., the CQI index 1) according to a channel measurement performed on a channel between the communication device and the network. Then, the communication device transmits an indicator indicating "32" to the network. Note that the communication device may transmit the indicator by transmitting bits "01" to the network according to the bit representation table 42.

In another example, the network may configure (e.g., indicate) the CQI index 3 to the communication device, e.g., via a higher layer signaling (e.g., RRC signaling). Accordingly, the communication device may determine that it needs 128 reference resources to achieve the CQI index 3 according to the channel measurement. Then, the communication device transmits an indicator indicating "128" to the network. Similarly, the communication device may transmit the indicator by transmitting bits "11" to the network according to the bit representation table 42.

Please refer to FIG. 5, which is a schematic diagram of a CQI mapping table 50 including corresponding parameters according to an example of the present invention, wherein corresponding MCSs and efficiencies are also shown. In one example, the communication device may determine that it needs 32 reference resources to achieve the lowest CQI level (i.e., the CQI index 1) according to a channel measurement performed on a channel between the communication device and the network. Then, the communication device transmits an indicator indicating "16" to the network, since the network can obtain 32 by multiplying "16" by the parameter 2. Note that the communication device may transmit the indicator by transmitting bits "00" to the network according to the bit representation table 42. In another example, the network may configure the CQI index 3 to the communication device, e.g., via a CSI request field of DL control information. Accordingly, the communication device may determine that it needs 128 reference resources to achieve the CQI index 3 according to the channel measurement. Then, the communication device transmits an indicator indicating "16" to the network, since the network can obtain 128 by multiplying "16" by parameter 8. Note that the communication device may transmit the indicator by transmitting bits "00" to the network according to the bit representation table 42. Although the parameters are predetermined in the table 50 in the present example, this is not a limitation for realizing the present invention. The parameters may also be semi-statically configured or dynamically configured.

Please refer to FIG. 6, which is a schematic diagram of a CQI mapping table 60 including newly added entries according to an example of the present invention, wherein corresponding MCSs and efficiencies are also shown. In FIG. 6, CQI indices 0-7 are newly added entries for improve resolution of the CQI index. In one example, the communication device may determine that it needs 32 reference resources to achieve the CQI index 8 (e.g., the lowest CQI level achieving BLER≤0.1) according to a channel measurement performed on a channel between the communication device and the network. Then, the communication device transmits an indicator indicating the CQI index 3 to the network. Note that the communication device may transmit the indicator by transmitting bits "0011" to the network according to the corresponding bit representation. In another example, the communication device may determine that it needs 8 reference resources to achieve the CQI index 8 according to the channel measurement. Then, the communication device transmits an indicator indicating the CQI index 5 to the network. Note that the communication device may transmit the indicator by transmitting bits "0101" to the network according to the corresponding bit representation.

Thus, according to the process 30 and the above description, the network can communicate with the communication device according to a proper MCS determined corresponding to the received CQI level. As a result, throughput of the communication device is improved.

Figure 7:
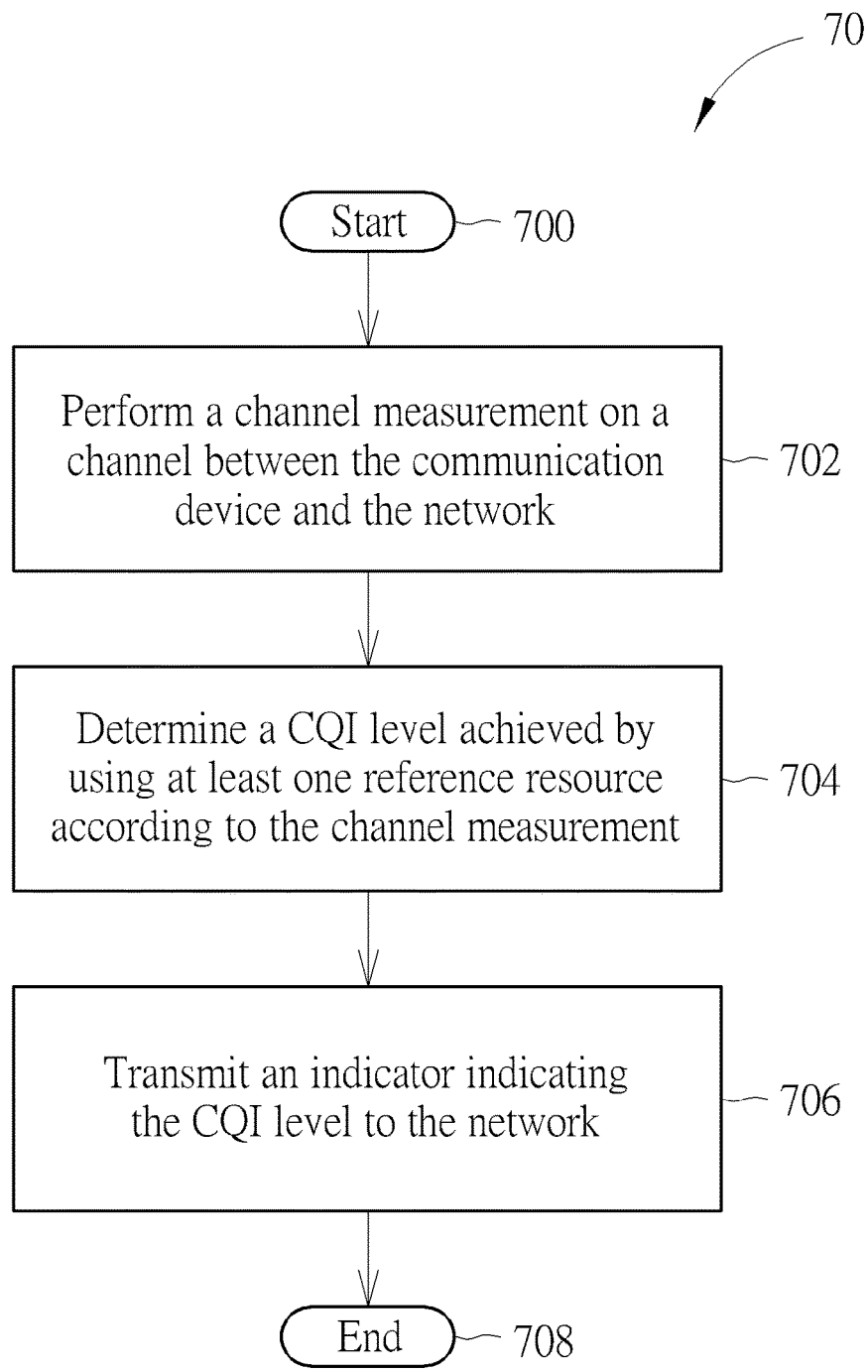
FIG. 7 is a flowchart of a process according to an example of the present invention.

Please refer to FIG. 7, which is a flowchart of a process 70 according to an example of the present invention. The process 70 can be utilized in a communication device shown in FIG. 1, for reporting CQI. The process 70 may be compiled into the program code 214 and includes the following steps:

Step 700: Start.

Step 702: Perform a channel measurement on a channel between the communication device and the network.

Step 704: Determine a CQI level achieved by using at least one reference resource according to the channel measurement.

Step 706: Transmit an indicator indicating the CQI level to the network.

Step 708: End.

According to the process 70, the communication device performs a channel measurement on a channel between the communication device and the network, and determines a CQI level (i.e., CQI or CQI index) achieved by using at least one reference resource (e.g., CSI reference resource) according to the channel measurement. Note that a reference resource can be referred to any resource capable of being used for performing the channel measurement, e.g., for determining quality of the communication device and the network. For example, a reference resource need to be accumulated (e.g., combined) for N times via a combination method to achieve the CQI level. Then, the communication device transmits an indicator indicating the CQI level to the network. In other words, the network is able to know the channel accurately according to both the CQI level and the number of the at least one reference resource. Thus, the network can communicate with the communication device according to a proper modulation and coding scheme (MCS) corresponding to the received CQI level. As a result, throughput of the communication device is improved.

Realization of the present invention is not limited to the above description.

In one example, the communication device may be for coverage enhancement (CE), and the CQI mapping table may be designed for the CE. In one example, the CE may correspond to at least one first parameter, a first criterion and/or at least one first dedicated resource different from at least one second parameter, a second criterion and/or at least one second dedicated resource corresponding to a normal mode defined in the 3GPP standard. That is, the CE can be seen as a mode in which the communication device can perform an operation in a way (e.g., easily and/or quickly under a relaxed requirement) different from that of the normal mode. Note that the at least one first parameter, the first criterion and/or the at least one first dedicated resource may be obtained by modifying the at least one second parameter, the second criterion and/or the at least one second dedicated resource defined in the 3GPP standard, respectively. In another example, the at least one first parameter, the first criterion and/or the at least one first dedicated resource may be newly added (e.g., defined) in the 3GPP standard (e.g., of a new version).

In one example, a number of the at least one reference resource may be a predetermined value. In another example, a number of the at least one reference resource may be configured to the communication device via a higher layer signaling (e.g., RRC signaling) or via a CSI request field of downlink control information transmitted by the network. That is, the number of the at least one reference is not determined by the communication device, but is indicated by the network via the higher layer signaling or via the CSI request field.

In addition, the communication device may further transmit another indicator indicating a number of the at least one reference resource to the network. For example, the situation may happen if the number of the at least one reference resource is determined by the communication device but not the network. In another example, the situation may happen if the number of the at least one reference resource determined by the network is changed or adjusted by the communication device. Similarly, the another indicator may indicate a base number, wherein the number of the at least one reference resource is a function of the base number and a parameter. That is, the number of the at least one reference resource is determined according to both the base number and the parameter. The parameter can be predetermined, configured via a higher layer signaling (e.g., RRC signaling) or configured dynamically (e.g., via a CSI request field of DL control information transmitted by the network).

Note that the indicator indicating the CQI level may be represented by a plurality of bits. That is, the bits representing the indicator are transmitted to the network for providing information of the CQI level to the network. Similarly, the another indicator indicating he number of the at least one reference resource may also be represented by a plurality of bits. That is, the bits representing the another indicator are transmitted to the network for providing information of the number of the at least one reference resource to the network.

In addition, the indicator may indicate the number of the at least one reference resource to the network by indicating a newly added entry (e.g., CQI index with corresponding parameters) in a CQI mapping table. That is, existed entries in the CQI mapping table may not be enough for accurately identifying the CQI level (e.g., due to insufficient resolution). Thus, one or more new entries can be added in the CQI mapping table for the communication device to indicate a CQI level by using one of the newly added entry(ies). Further, the CQI mapping table can even be newly designed for including the newly added entry(ies).

Please refer to FIG. 8, which is a schematic diagram of a CQI mapping table 80 and a bit representation table 82 according to an example of the present invention, wherein corresponding MCSs and efficiencies are also shown. In one example, the communication device may determine that it can achieve the CQI index 3 by using 128 reference resources according to a channel measurement performed on a channel between the communication device and the network. Then, the communication device transmits an indicator indicating the CQI index 3 to the network. In another example, the network may configure "128" to the communication device by transmitting bits "10" to the communication device according to the bit representation table 82. Accordingly, the communication device may determine the CQI index it can achieve by using 128 reference resources.

Figure 9:
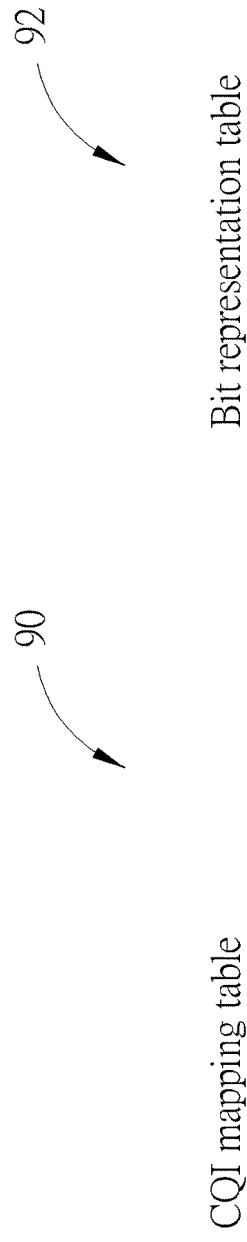
FIG. 9 is a schematic diagram of a CQI mapping table and a bit representation table according to an example of the present invention.

Please refer to FIG. 9, which is a schematic diagram of a CQI mapping table 90 and a bit representation table 92 according to an example of the present invention, wherein corresponding MCSs and efficiencies are also shown. In one example, the communication device may determine that it can achieve the CQI index 2 by using 64 reference resources according to a channel measurement performed on a channel between the communication device and the network. Then, the communication device transmits a first indicator indicating "64" and a second indicator indicating the CQI index 2 to the network. That is, information of both the number of the resources and the CQI index are provided to the network. For example, the situation may happen if both the CQI index and the number of the at least one reference resource are determined by the communication device but not the network. Note that the communication device may transmit bits "0110" to the network, wherein the first indicator indicating "64" is represented by the first two bits "01" and the second indicator indicating the CQI index 2 is represented by the last two bits "10".

Figure 10:
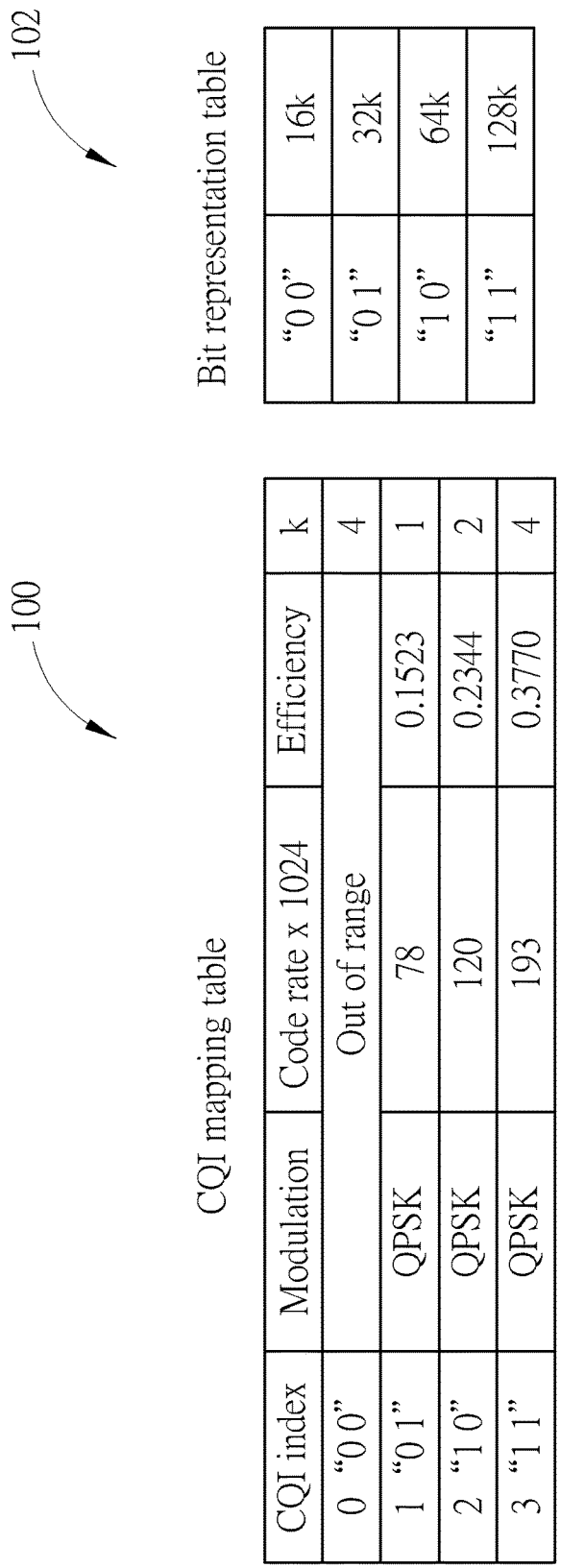
FIG. 10 is a schematic diagram of a CQI mapping table and a bit representation table according to an example of the present invention.

Please refer to FIG. 10, which is a schematic diagram of a CQI mapping table 100 and a bit representation table 102 according to an example of the present invention, wherein corresponding MCSs and efficiencies and parameter k's are also shown. In one example, the communication device may determine that it can achieve the CQI index 1 by using 64 reference resources according to a channel measurement performed on a channel between the communication device and the network. Then, the communication device transmits a first indicator indicating "64*1" and a second indicator indicating the CQI index 1 to the network. That is, information of both the number of the resources and the CQI index are transmitted to the network. In this situation, the communication device may transmit bits "1001" to the network, wherein the first indicator indicating "64*k" is represented by the first two bits "10" and the second indicator indicating the CQI index 1 is represented by the last two bits "01". Accordingly, the network can determine that k=1 according to the CQI mapping table.

Figure 11:
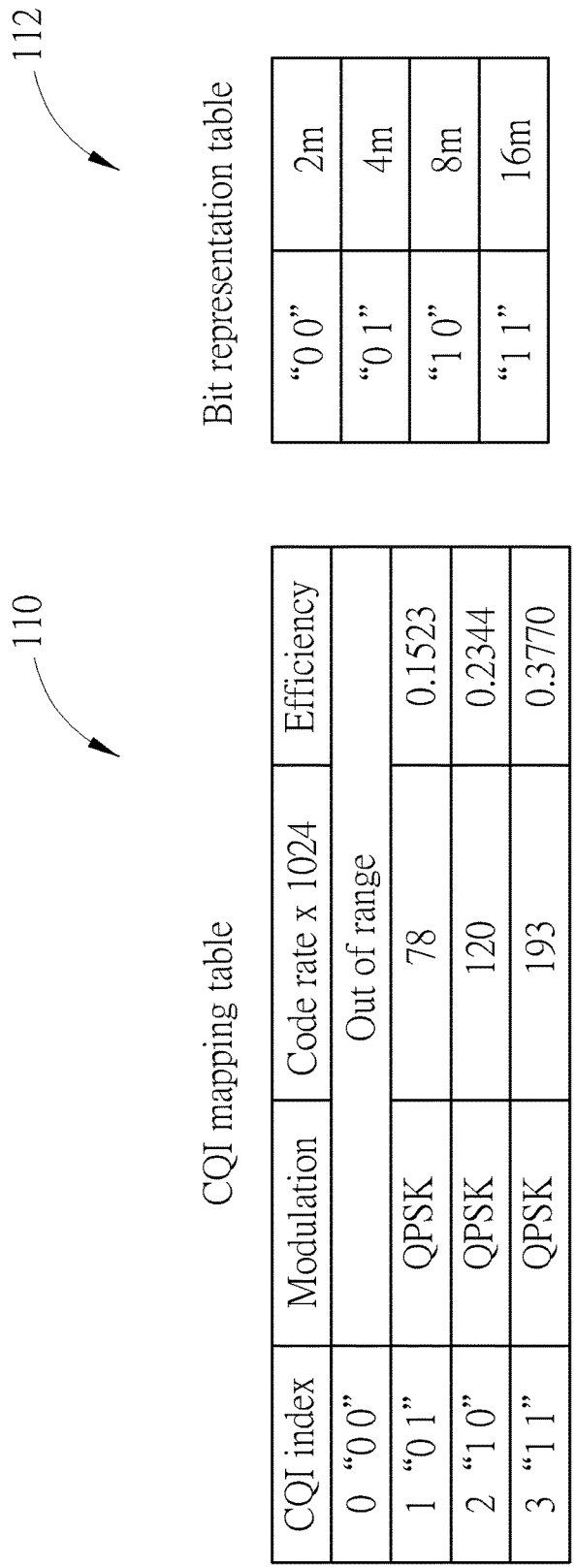
FIG. 11 is a schematic diagram of a CQI mapping table and a bit representation table according to an example of the present invention.

Please refer to FIG. 11, which is a schematic diagram of a CQI mapping table 110 and a bit representation table 112 according to an example of the present invention, wherein corresponding MCSs and efficiencies. The parameter m in the bit representation table 112 can be configured as 1 or 16 (e.g., semi-statically or dynamically) by the network. In the following examples, it is assumed that m=16 has been configured. In one example, the communication device may determine that it can achieve the CQI index 1 by using 128 reference resources according to a channel measurement performed on a channel between the communication device and the network. Then, the communication device transmits a first indicator indicating "8*16" and a second indicator indicating the CQI index 1 to the network. That is, both the number of the resources and the CQI index are transmitted to the network. In this situation, the communication device may transmit bits "1001" to the network, wherein the first indicator indicating "8*m" is represented by the first two bits "10" and the second indicator indicating the CQI index 1 is represented by the last two bits "01". The network can determine that the number of the resources is 128 since m=16 has been configured.

Thus, according to the process 70 and the above description, the network can communicate with the communication device according to a proper MCS determined corresponding to the received CQI level. As a result, throughput of the communication device is improved.

Please note that, the CQI mapping tables in FIGS. 4-6 and 8-11 are only for illustration. The present invention can also be applied to various CQI mapping tables including existed CQI tables defined in the 3GPP standard and newly designed CQI tables, and are not limited herein. Similarly, the bit representation tables in FIGS. 4 and 8-11 are only for illustration. The present invention can also be applied to various bit representation tables including existed bit representation tables defined in the 3GPP standard and newly designed bit representation tables, and are not limited herein. In addition, a CQI mapping table and/or bit representation table may be completely predetermined and stored in the network and/or the communication device. In another example, a CQI mapping table and/or bit representation table may be partly predetermined and stored in the network and/or the communication device, and the rest information (e.g., parameter(s)) is determined (e.g., configured) semi-statically or dynamically.

Figure 12:
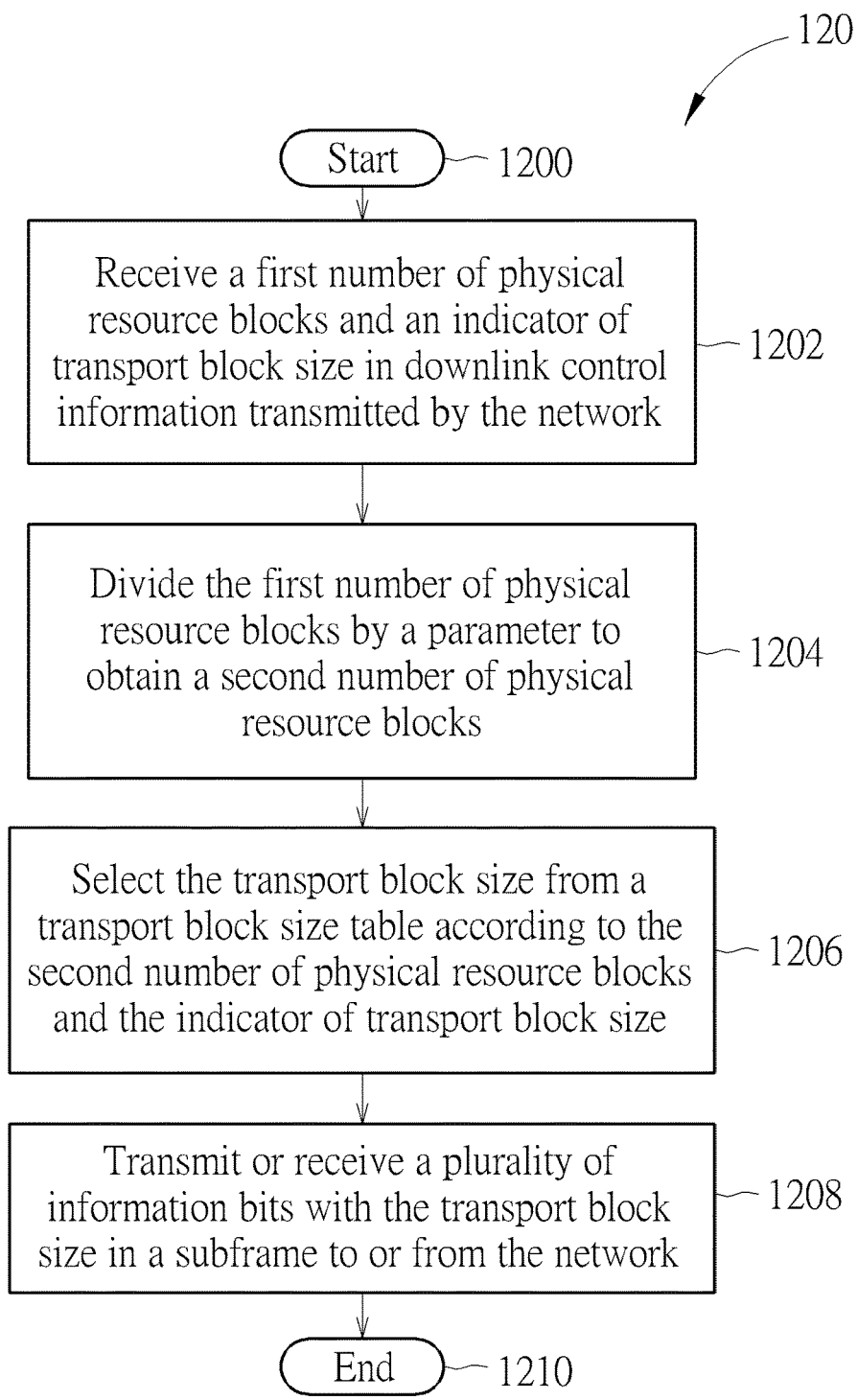
FIG. 12 is a flowchart of a process according to an example of the present invention.

Please refer to FIG. 12, which is a flowchart of a process 120 according to an example of the present invention. The process 120 can be utilized in a communication device shown in FIG. 1, for selecting a transport block size. The process 120 may be compiled into the program code 214 and includes the following steps:

Step 1200: Start.

Step 1202: Receive a first number of physical resource blocks and an indicator of transport block size in downlink control information transmitted by the network.

Step 1204: Divide the first number of physical resource blocks by a parameter to obtain a second number of physical resource blocks.

Step 1206: Select the transport block size from a transport block size table according to the second number of physical resource blocks and the indicator of transport block size.

Step 1208: Transmit or receive a plurality of information bits with the transport block size in a subframe to or from the network.

Step 1210: End.

According to the process 120, the communication device receives a first number of physical resource blocks and an indicator of transport block size in downlink control information transmitted by the network, and divides the first number of physical resource blocks by a parameter (e.g., predetermined or configured by the network) to obtain a second number of physical resource blocks. Then, the communication device selects the transport block size from a transport block size table (e.g., which is defined in the 3GPP standard) according to the second number of physical resource blocks and the indicator of transport block size. Thus, the communication device can transmit (or receive) a plurality of information bits with the transport block size in a subframe to (or from) the network. In other words, the communication device does not use the first number of physical resource blocks and the indicator of transport block size indicated by the network directly, but reduces the number of physical resource blocks to be used by using the parameter. Thus, robustness of the transmission/reception is improved by reducing the transport block size. In addition, original transport block size tables defined in the 3GPP standard can be used, and modifications of the original transport block size tables or designs of new transport block size tables are not needed.

Please refer to FIG. 13, which is a schematic diagram of a transport block size table 130 according to an example of the present invention. The transport block size table 130 includes multiple transport block sizes wherein each of the transport block size can be determined (e.g., selected) according to a number of physical resource blocks $N_{PRB}$ and an indicator of transport block size $I_{TBS}$. In one example, the communication device obtains $N'_{PRB}=N_{PRB}/N=25$ according to the process 120, after receiving $N_{PRB}=50$ and $I_{TBS}=0$ in the DCI transmitted by the network and assuming the parameter N=2. Then, the communication device can determine that the transport block size is 680 according to $N'_{PRB}=25$ and $I_{TBS}=0$. Further, the communication device can transmit (or receive) 680 information bits in a subframe to (or from) the network. In general, coded bits encoded from the information bits are transmitted in the subframe, and a number of the coded bits (e.g., 8500) is usually greater than a number of the information bits (which is 680 in the present example). Thus, robustness of the transmission/reception is improved by reducing the transport block size while the transport block size table 130 is reused.

In addition to transmitting (or receiving) the information bits with the transport block size in the subframe, the communication device may further transmit (or receive) the information bits with the transport block size in another at least one subframe to (or from) the network, wherein a number of the subframe and the another at least one subframe is specified by another parameter. That is, the first parameter (e.g., predetermined or configured by the network) is used for determining the number of physical resource blocks (i.e., number of physical resource blocks in the process 30), and the second parameter (e.g., predetermined or configured by the network) is used for determining the number of the subframes wherein the information bits are transmitted (e.g., possibly in terms of different numbers coded bits) in each of the subframes. Thus, robustness of the transmission/reception is improved by reducing the transport block size and/or increasing a number of resources for the transmission/reception. Note that the first parameter and the second parameter can be the same. That is, a single parameter is used for determining both the number of physical resource blocks and the number of the subframes.

Please refer to FIG. 13, in one example, the communication device first determines that the transport block size is 1384, after receiving $N_{PRB}$=50 and $I_{TBS}$=0 in the DCI transmitted by the network. Then, assuming the first parameter and the second parameter are both 2, the communication device obtains $N'_{PRB}$=$N_{PRB}$/N=25 according to the process 120 and transmits (or receives) information bits with the block size 680 in 2 subframes. That is, the communication device transmits (or receives) 680 information bits in a first subframe to (or from) the network and transmits (or receives) the same 680 information bits in a second subframe. As stated previously, in general, coded bits encoded from the information bits are transmitted in a subframe, and a number of the coded bits (e.g., 8500) is usually greater than a number of the information bits (which is 680 in the present example). In the present example, the number of coded bits in the subframes may be different due to different code rates, modulation schemes, etc., even if the coded bits in the subframes come from the same information bits. Thus, robustness of the transmission/reception is improved by reducing the transport block size and/or increasing a number of resources for the transmission/reception while the transport block size table 130 is reused.

In addition, the parameter(s) are used for determining the number of subframes in the above example. However, a number of physical resource blocks (i.e., $N_{PRB}$') can also be used for determining the number of subframes. For example, $N_{PRB}$' may be predetermined (or configured by the network) in the communication device, the communication device can obtain the parameter as $N_{PRB}$/$N_{PRB}$ after receiving $N_{PRB}$ transmitted by the network. Then, the communication device can transmit (or receive) information bits in $N_{PRB}$'/$N_{PRB}$ subframes.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method of reporting CQI for a communication device. Accordingly, the communication device can provide accurate CQI and sufficient information to the network, and the network can communicate with the communication device according to a proper MCS corresponding to the received CQI. As a result, throughput of the communication device is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of reporting channel state information (CSI) for a communication device, the method comprising:
performing a channel measurement on a channel between the communication device and a network;
determining a number of times that at least one reference resource needed to be accumulated for achieving a CQI level in a CQI mapping table according to the channel measurement; and
transmitting an indicator indicating the number of times that the at least one reference resource to be accumulated to the network;
wherein the at least one reference resource is used for determining the CSI.

2. The method of claim 1, wherein the CQI level is the lowest CQI level in a CQI mapping table.

3. The method of claim 1, wherein the CQI level is configured to the communication device via a higher layer signaling or via a CSI request field of downlink control information transmitted by the network.

4. The method of claim 1, wherein the indicator indicates a base number, and the number of the at least one reference resource is a function of the base number and a parameter which is predetermined, configured via a higher layer signaling, or configured dynamically.

5. The method of claim 1, wherein the indicator is represented by a plurality of bits.

6. The method of claim 1, wherein the indicator indicates the number of the at least one reference resource to the network by indicating an entry in the CQI mapping table.

7. The method of claim 1, wherein the communication device is for coverage enhancement (CE), and the CQI mapping table is designed for the CE, wherein the CE corresponds to at least one first parameter, a first criterion and/or at least one first dedicated resource different from at least one second parameter, a second criterion and/or at least one second dedicated resource corresponding to a normal mode defined in the 3rd Generation Partnership Project (3GPP) standard.

8. The method of claim 1, wherein the indicator is corresponding to at least one of a modulation and a code rate.

9. The method of claim 8, wherein the modulation comprises "Quadrature Phase-Shift Keying (QPSK)", when the number of times that at least one reference resource needed to be accumulated is one of 1, 2, 4, 8, 16, 32, 64 and 128.

10. The method of claim 8, wherein the modulation comprises "16 Quadrature Amplitude Modulation (QAM)", when the number of times that at least one reference resource needed to be accumulated is 1.

11. The method of claim 8, wherein the modulation comprises "64 Quadrature Amplitude Modulation (QAM)", when the number of times that at least one reference resource needed to be accumulated is 1.

12. A method of reporting channel state information (CSI) for a communication device, the method comprising:
determining a number of times that at least one reference resource needed to be accumulated according to a higher layer signaling;
performing a channel measurement on a channel between the communication device and a network according to the number of times that the at least one reference resource needed to be accumulated;

determining a CQI level in a CQI mapping table achieved by using the at least one reference resource according to the channel measurement; and transmitting a first indicator indicating the CQI level to the network;

wherein the at least one reference resource is used for determining the CSI.

13. The method of claim 12, wherein the first indicator is represented by a plurality of bits.

14. The method of claim 12, wherein the first indicator indicates the CQI level by indicating an entry in the CQI mapping table.

15. The method of claim 12, wherein the communication device is for coverage enhancement (CE), and the CQI mapping table is designed for the CE, wherein the CE corresponds to at least one first parameter, a first criterion and/or at least one first dedicated resource different from at least one second parameter, a second criterion and/or at least one second dedicated resource corresponding to a normal mode defined in the 3rd Generation Partnership Project (3GPP) standard.

16. The method of claim 12, wherein each of the at least one reference resource are defined according to the 3GPP Re-10 standard.

17. A communication device for reporting channel state information (CSI), comprising:
a storage unit for storing instructions of:
determining a number of times that at least one reference resource needed to be accumulated according to a higher layer signaling;
performing a channel measurement on a channel between the communication device and a network according to the number of times that the at least one reference resource needed to be accumulated;
determining a CQI level in a CQI mapping table achieved by using the at least one reference resource according to the channel measurement; and
transmitting a first indicator indicating the CQI level to the network;
wherein the at least one reference resource is used for determining the CSI; and
a processing means, coupled to the storage unit, configured to execute the instructions stored in the storage unit.

18. The communication device of claim 17, wherein the first indicator is represented by a plurality of bits.

19. The communication device of claim 17, wherein the first indicator indicates the CQI level by indicating an entry in the CQI mapping table.

20. The communication device of claim 17, wherein the communication device is for coverage enhancement (CE), and the CQI mapping table is designed for the CE, wherein the CE corresponds to at least one first parameter, a first criterion and/or at least one first dedicated resource different from at least one second parameter, a second criterion and/or at least one second dedicated resource corresponding to a normal mode defined in the 3rd Generation Partnership Project (3GPP) standard.

21. The communication device of claim 17, wherein each of the at least one reference resource are defined according to the 3GPP Re-10 standard.

* * * * *